US006688256B1

(12) United States Patent           (10) Patent No.:     US 6,688,256 B1
King                                 (45) Date of Patent:     Feb. 10, 2004

(54) ANIMAL ENCLOSURE

(76) Inventor: Lise King, 10 Farm View Rd., Port Washington, NY (US) 11050

( * ) Notice: Subject to any disclaimer, the term of this patent is extended or adjusted under 35 U.S.C. 154(b) by 0 days.

(21) Appl. No.: 10/246,258

(22) Filed: Sep. 18, 2002

Related U.S. Application Data

(63) Continuation-in-part of application No. 09/952,053, filed on Sep. 11, 2001.
(60) Provisional application No. 60/232,712, filed on Sep. 15, 2000.

(51) Int. Cl.[7] ........................ A01K 1/02; E04H 15/36; E04H 15/44
(52) U.S. Cl. .................... 119/474; 135/124; 135/128
(58) Field of Search ............................ 119/474, 422, 119/452, 482; 135/90, 121, 124, 126, 128

(56) References Cited

U.S. PATENT DOCUMENTS

| 579,612 | A |   | 3/1897 | Stevens |  |
|---|---|---|---|---|---|
| 970,873 | A | * | 9/1910 | Bear | 119/482 |
| 1,388,478 | A | * | 8/1921 | Nelson | 135/138 |
| 1,887,108 | A |   | 1/1932 | Steese |  |
| 1,904,700 | A | * | 4/1933 | Starks | 47/20.1 |
| 2,155,209 | A |   | 4/1939 | Walker |  |
| 2,587,255 | A |   | 2/1952 | Vogel et al. |  |
| 3,088,244 | A | * | 5/1963 | Commisso | 47/29.1 |
| 3,171,417 | A |   | 3/1965 | Stokes |  |
| 3,744,455 | A |   | 7/1973 | Fowler |  |
| 3,929,145 | A | * | 12/1975 | Schroeder | 135/128 |
| 3,931,918 | A |   | 1/1976 | Smith et al. |  |
| 3,970,096 | A |   | 7/1976 | Nicolai |  |
| 4,150,682 | A | * | 4/1979 | Ryce | 135/130 |
| 4,576,116 | A |   | 3/1986 | Binkert |  |
| 4,597,402 | A |   | 7/1986 | Morris, Jr. |  |
| 5,159,948 | A | * | 11/1992 | Moreau et al. | 135/125 |
| 5,335,618 | A |   | 8/1994 | Zarola |  |
| 5,343,887 | A | * | 9/1994 | Danaher | 135/156 |
| 5,479,744 | A | * | 1/1996 | Meyer | 52/63 |
| 5,551,372 | A |   | 9/1996 | Nicholls |  |
| 5,634,638 | A |   | 6/1997 | Havens et al. |  |
| 5,755,176 | A | * | 5/1998 | Edwards | 119/51.01 |

OTHER PUBLICATIONS

Brown Kennel Supply, Inc., HOMESTRETCH Portable Pet Enclosure, Sep. 4, 1998, archived from the web on Dec. 5, 1998 at http://web.archive.org/web/19981205201504/http://www.brownkennelsupply.com/bks_hs.htm.*

* cited by examiner

Primary Examiner—Charles T. Jordan
Assistant Examiner—Bret Hayes
(74) Attorney, Agent, or Firm—Collard & Roe, P.C.

(57) ABSTRACT

A portable pet enclosure having a plurality of frame pieces connected via flexible netting. The frame pieces each contain a semicircular hoop having two end prongs for insertion into the ground. A cross-bar extends between the two legs of the frame several inches above the prongs to provide a base for resting on the ground. A door is attached to the end frame piece and secured closed via zipper. The pet enclosure is collapsible and easily transportable inside its own carrying bag.

7 Claims, 4 Drawing Sheets

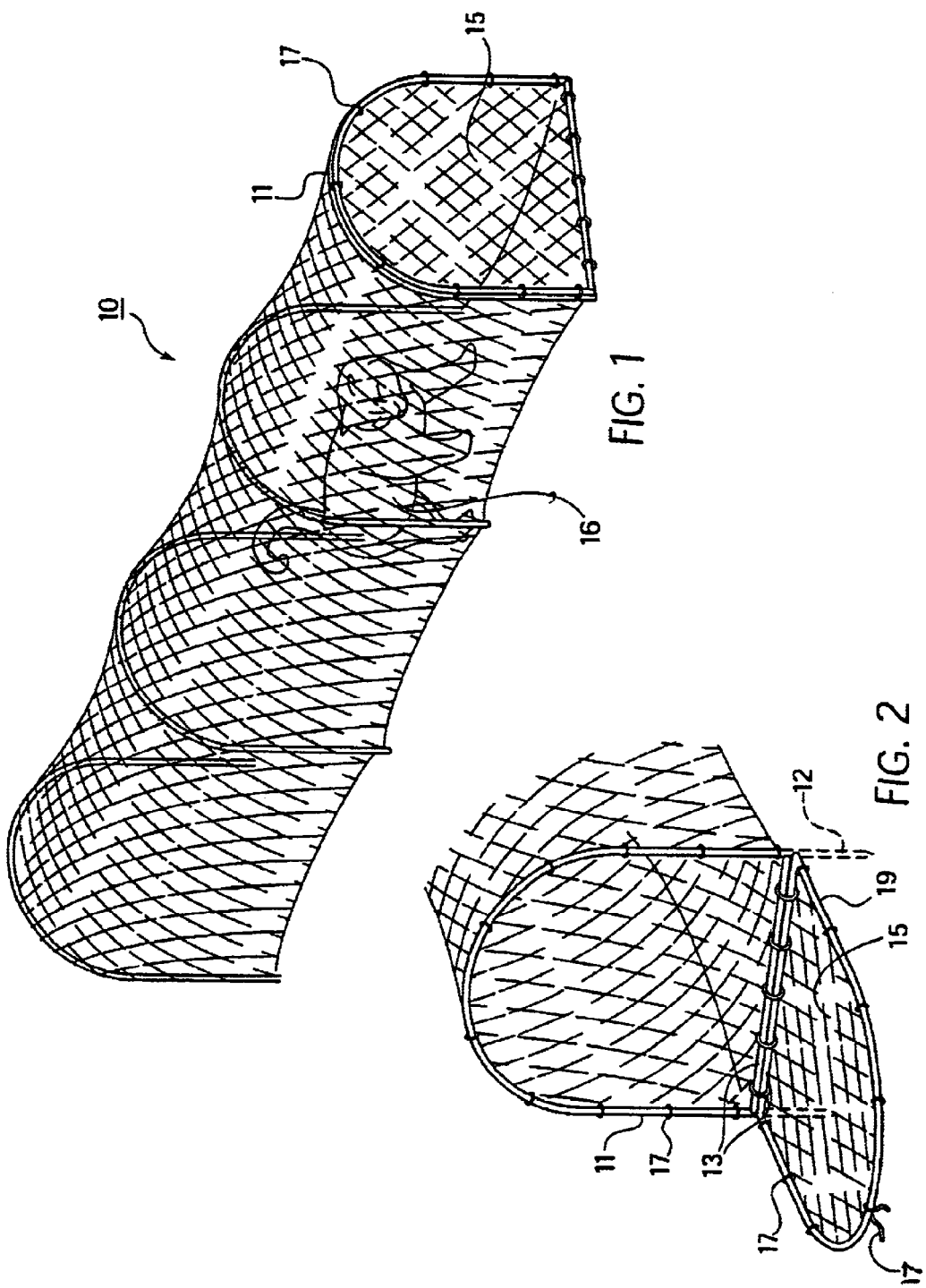

ANIMAL ENCLOSURE

CROSS-REFERENCE TO RELATED APPLICATIONS

This is a continuation-in-part of U.S. application Ser. No. 09/952,053, filed on Sep. 11, 2001, which claims the benefit under 35 U.S.C. §119 of Provisional Application Serial No. 60/232,712 filed Sep. 15, 2000.

BACKGROUND OF THE INVENTION

1. Field of the Invention

This invention relates to an animal enclosure for keeping small animals outside. In particular, the invention relates to an animal enclosure that is lightweight and portable and yet provides a safe place for small animals to exercise outside without the risk of escape.

2. The Prior Art

Small animals such as cats often like to spend time outside. However, when the animal is an "indoor" pet, it cannot be allowed to roam freely throughout the neighborhood, without risk of becoming lost, injured, or diseased. Various enclosures have been developed to keep these pets within a defined area outside. For example, U.S. Pat. No. 5,551,372 to Nicholls discloses a modular cage system having a series of cage-like structures connected by walkways. While this device is suitable for containing a pet and allowing it freedom to move, it is cumbersome to move and store.

Other devices, such as cages are also used to enclose a pet when outside. However, a cage may also be cumbersome to move, even those that are collapsible. In addition, a cage confines the movement of the pet to a certain square radius. This limiting of motion does not allow the pet to move freely around an area and enjoy its surroundings.

These devices are not suitable for allowing a pet to have unlimited motion while being outside, while at the same time protecting the pet from external dangers.

SUMMARY OF THE INVENTION

It is therefore an object of the invention to provide a portable pet enclosure that allows the pet sufficient freedom of movement with no risk of escape.

It is another object of the invention to provide a portable pet enclosure that is simple to set up and take down.

It is another object of the invention to provide a portable pet enclosure that is inexpensive to manufacture.

It is a further object of the invention to provide a portable pet enclosure that is lightweight and can be carried in one hand in its own bag.

It is a yet further object to provide a pet enclosure that allows substantially unlimited movement of the animal but at the same time protects the animal from external dangers.

These and other objects of the invention are accomplished by a portable pet enclosure comprising a plurality of frame pieces connected via flexible netting. The frame pieces each comprise a semicircular hoop having two end prongs for insertion into the ground. A cross-bar extends between the two legs of the frame several inches above the prongs to provide a base for resting on the ground.

The frame piece could also have other shapes, such as rectangular, triangular, etc., as long as it provides a sufficient cross-section for the animal to move, and has two free ends for insertion into the ground. The frame pieces are preferably made of a strong, weather resistant material, such as aluminum, steel or heavy plastic.

The hoop portion and cross-bar are covered in a netting material, which allows light and air through, but cannot be easily torn by an animal's teeth or claws. A suitable material for this purpose is fish netting, which is a wide-weave nylon net material. Other materials, such as cotton, could also be used.

The frame pieces are arranged parallel with each other in a line, and covered by the netting material, to form a tunnel. The netting also covers the bottom portion of the frame pieces along the crossbars, to keep the animal from burrowing out. Each prong of the frame pieces is inserted into the ground to keep the enclosure upright.

At each end of the tunnel, there can be a door piece attached, to let the animal in and out. The door is preferably formed of one of the frame pieces without the prongs. The face of the frame is covered by netting and is pivotally attached along the crossbar to the end frame piece. The top of the door is then releasably secured to the top of the end frame piece. To let the animal in and out, the top of the door is released and the door folds down to open the enclosure.

In an alternative embodiment, the entire periphery of the door is attached to the frame via a zipper. This way, the animal is securely enclosed in the enclosure and cannot escape by pressing on the door.

To move the enclosure, the prongs are lifted out of the ground, and the frame pieces are stacked up on top of each other. The netting is flexible and folds with the stack. The entire enclosure can then be placed in a bag and carried to the next destination.

Preferably, the enclosure is at least 10 feet long, and at least 32" high and 24" wide. This provides sufficient room for a cat or other animal to exercise and be content. The prongs are preferably about 8" long, but can be shorter or longer depending on the amount of stability required. For example, the larger the frame piece and/or the heavier the material, the longer the prong required to keep the piece upright in the ground.

The netting is preferably attached to the frame pieces via rope or string that is wrapped through the holes in the netting and around each frame piece. Other means of attachment could also be used, such as adhesives, rivets, binding, etc.

BRIEF DESCRIPTION OF THE DRAWINGS

Other objects and features of the present invention will become apparent from the following detailed description considered in connection with the accompanying drawings. It is to be understood, however, that the drawings are designed as an illustration only and not as a definition of the limits of the invention.

In the drawings, wherein similar reference characters denote similar elements throughout the several views:

FIG. 1 shows a perspective view of the enclosure according to the invention;

FIG. 2 shows a perspective view of the door assembly with the enclosure according to the invention;

DETAILED DESCRIPTION OF THE PREFERRED EMBODIMENT

Figure 3:
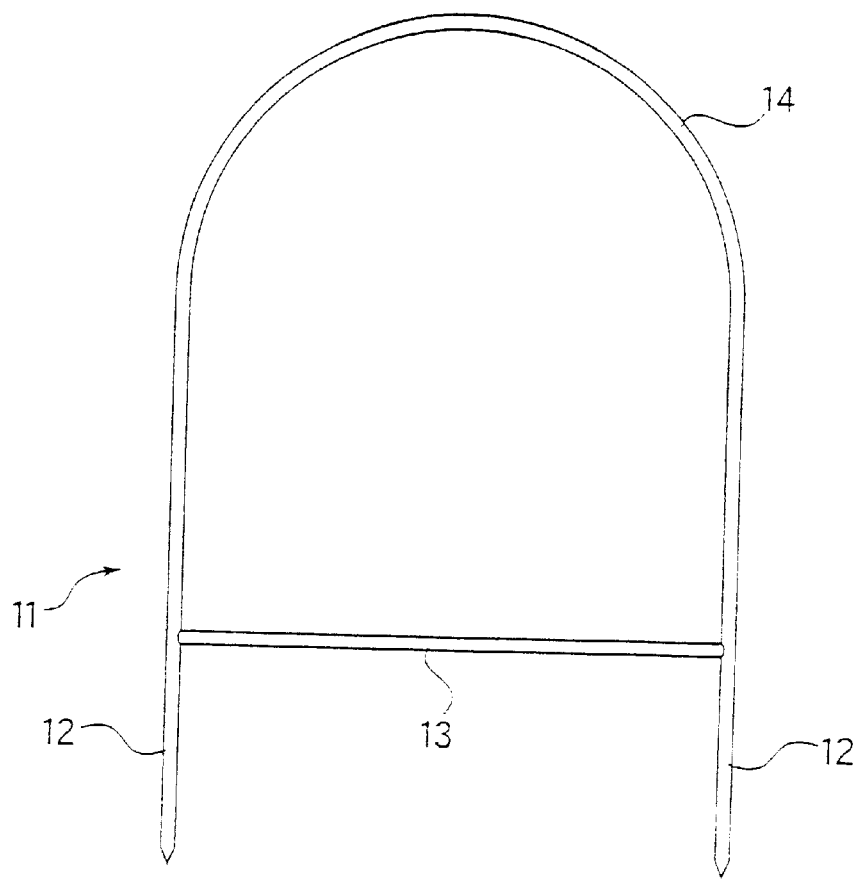
FIG. 3 shows a front view of one of the frame pieces according to the invention.

Referring now in detail to the drawings, FIGS. 1–3 show the enclosure 10 according to the invention. Enclosure 10 comprises a plurality of frame pieces 11 each having two prongs 12, a crossbar 13 and a hoop portion 14, as shown in detail in FIG. 3. Frame pieces could also have alternative shapes, such as rectangular, triangular, etc. Prongs 12 of frame pieces 11 are inserted into the ground to keep frame pieces 11 stable. A portion of netting 15 is secured around frame pieces 11 to form a tunnel enclosure for an animal such as a cat 16. Netting 15 is secured around frame pieces 11 by wrapping a rope 17 through netting 15 and around frame pieces 11. Netting 15 can be of any suitable material and gauge, as long as it lets in sufficient light and air and yet cannot be easily torn by the animal. Netting 15 surrounds the hoop portion 14 and crossbar 13 of the frame piece 11, leaving prongs 12 free. This way, the animal is completely encased by the netting and cannot burrow out of the enclosure to escape. However, the netting is sufficiently porous so that the animal can feel the grass or other surface beneath its feet, and have the true feeling of being outside. The length of the device being preferably ten feet, allows substantially unlimited motion of the animal.

FIG. 2 shows a door assembly for use on the end frame pieces 11. A door 19 is comprised of a frame piece minus the prongs. Door 19 is covered in netting 15 and pivotally attached to frame piece 11 by wrapping rope around the crossbars 13 of each piece. Door 19 is closed by tying the top of it to the top of frame piece 11 with rope 17. Other means of securing door 19 could also be used. Door 19 is used on both ends of enclosure 10 to prevent escape by the animal.

Figure 4:
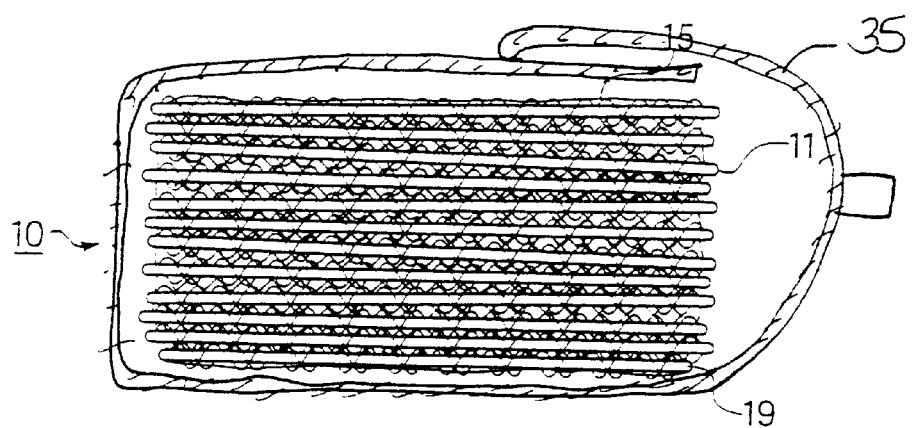
FIG. 4 shows the enclosure disassembled for transport.
Figure 5:
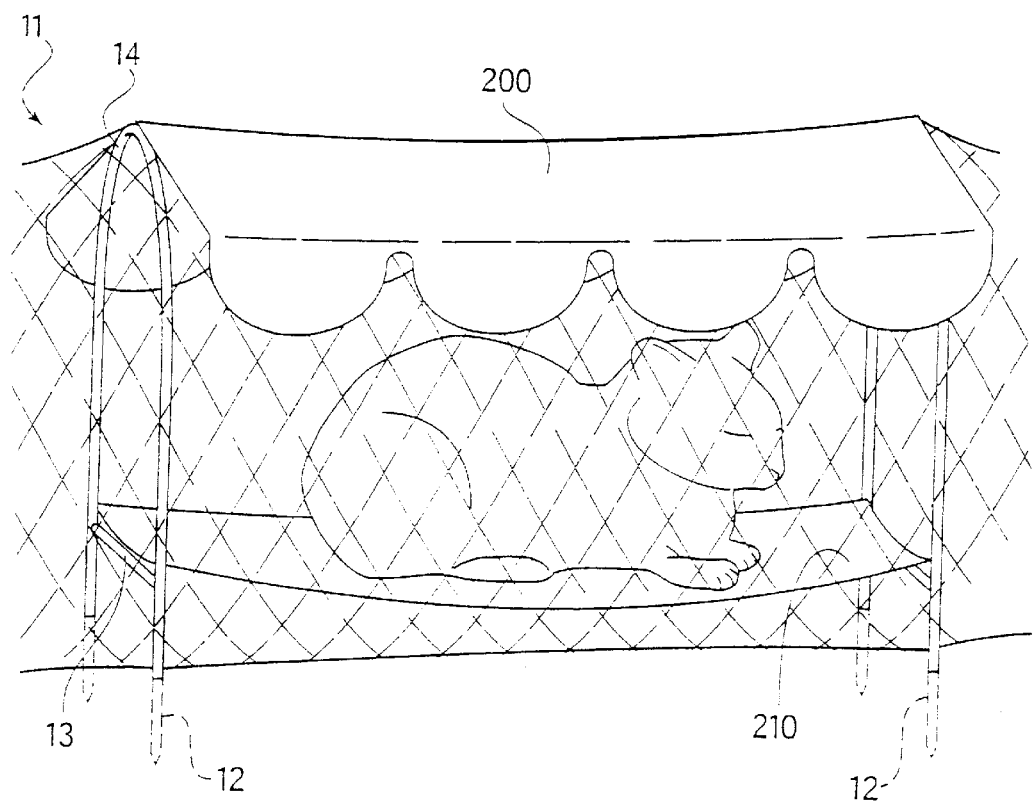
FIG. 5 shows the enclosure with the cabana and hammock.

The enclosure 10 can be taken out of the ground and stacked up for transport, as shown in FIG. 4. Since netting 15 is flexible, the entire enclosure can be stacked into a compact bundle, which can be easily placed in a bag 35 and carried with one hand. The enclosure is thus convenient for travel and provides a safe way for a pet to enjoy the outdoors.

In another embodiment the Kitty walk contains a canopy 200 and hammock 210 providing protection for the animal from environmental conditions.

Figure 6:
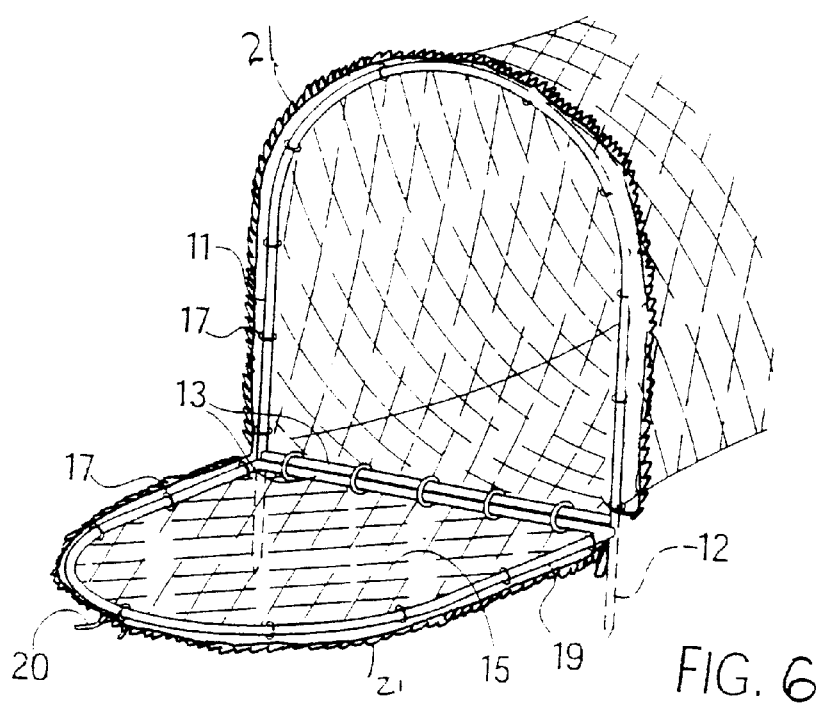
FIG. 6 shows an alternative embodiment of the animal enclosure wherein the door is secured via a zipper.

In the embodiment shown in FIG. 6, door 15 is attached to frame 11 via a zipper 21. Zipper 21 keeps the animal securely inside enclosure 10 where it cannot easily escape. This is particularly important with dogs, who can exert considerable force against the door.

Accordingly, while a few embodiments of the present invention have been shown and described, it is obvious that many changes and modifications may be made thereunto without departing from the spirit and scope of the invention.

What is claimed is:

1. A portable animal enclosure comprising:
    a bag for placement of the assembly for storage or transport;
    a plurality of frame pieces, each frame piece comprising:
        two prongs for inserting into a ground surface to keep the frame pieces stable;
        a cross bar disposed between said two prongs; and
        a hoop portion disposed above said two prongs attached to said cross bar;
    a portion of netting secured around the frame pieces forming a tunnel enclosure for an animal;
    a rope wrapped through the netting and around said cross bar and hoop portion for securing the netting to the frame pieces; and
    a door attached to an end frame piece of the assembly, said door being secured all around to said end frame piece via a zipper,
    wherein the assembly is collapsible for stacking and placing into the bag for transport.

2. The portable animal enclosure according to claim 1, wherein the hoop portion is rectangular in shape.

3. The portable animal enclosure according to claim 1, wherein the hoop portion is triangular in shape.

4. The portable animal enclosure according to claim 1, wherein the hoop portion is semi-circular in shape.

5. The portable animal enclosure according to claim 1, wherein the portion of netting comprises a material being porous allowing light and air in but not easily torn by the animal.

6. The portable animal enclosure according to claim 1, further comprising a canopy disposed over a portion of the tunnel enclosure providing protection for the animal from environmental conditions.

7. The portable animal enclosure according to claim 1, further comprising a hammock disposed in a portion of the tunnel enclosure providing protection for the animal from environmental conditions.

* * * * *